(No Model.)
F. E. DUCKHAM.
DELIVERY APPARATUS FOR PNEUMATIC GRAIN CONVEYERS.
No. 470,555. Patented Mar. 8, 1892.
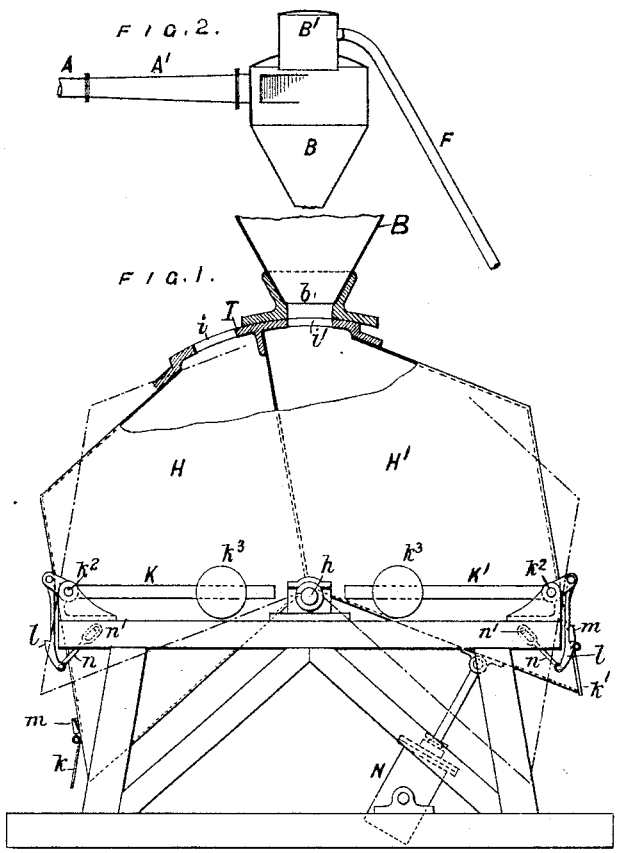
Witnesses:
C. Sedgwick
E. M. Clark
Inventor
F. E. Duckham
by Munn & Co
Attorneys.

UNITED STATES PATENT OFFICE.

FREDERIC ELIOT DUCKHAM, OF LONDON, ENGLAND.

DELIVERY APPARATUS FOR PNEUMATIC GRAIN-CONVEYERS.

SPECIFICATION forming part of Letters Patent No. 470,555, dated March 8, 1892.

Application filed August 20, 1891. Serial No. 403,175. (No model.) Patented in England July 29, 1890, No. 11,884; in France March 28, 1891, No. 212,422, and in Belgium March 28, 1891, No. 94,320.

*To all whom it may concern:*

Be it known that I, FREDERIC ELIOT DUCKHAM, engineer, of Millwall Docks, London, England, have invented a new and useful Delivery Apparatus for Pneumatic Grain-Conveyers, (for which I have obtained Letters Patent in the following countries, namely: in France, dated March 28, 1891, No. 212,422; in Belgium, dated March 28, 1891, No. 94,320, and in Great Britain, dated July 29, 1890, No. 11,884,) of which the following is a full, clear, and exact description.

My invention relates to pneumatic apparatus for use in unloading or conveying grain and other matters (in or between ships, barges, warehouses, granaries, bins, or other receivers) by the carrying power of a current of air.

My present improvement relates to discharging apparatus whereby the grain transported and deposited by the carrying-current is discharged without the admission of air being permitted in such quantity as to destroy the partial vacuum upon which the conveyance of the grain depends.

Reference is to be had to the accompanying drawings, forming part of this specification, wherein—

Figure 1 is an elevation, partly broken away, of the delivery apparatus; and Fig. 2 is a section, on a smaller scale, of the hopper to which it is applied.

The same letters of reference denote like parts in all the figures.

This delivery apparatus may be mounted upon a barge or other vessel or upon a wheeled or fixed structure on the wharf or elsewhere, according as the apparatus is to be used for transferring grain between ships or other conveyers and warehouses or granaries.

The chamber B, into which the suction-pipe A leads tangentially, (by a pipe-section A' of gradually-enlarged diameter in order to reduce the velocity of the grain,) may be in the form of a conical hopper, and is provided with a dome B', connected by a pipe F, provided with a stop-valve, with exhausting apparatus of any suitable kind by which a partial vacuum is maintained.

Beneath the chamber B is mounted to rock upon a horizontal axis $h$ a twin receiver H H', the upper part I of which is curved to an arc struck from center $h$, so as to make a comparatively air-tight joint in the manner of a slide-valve with the correspondingly-curved mouth $b$ of the conical hopper B. In this valve-face are two apertures $i$ $i'$, leading to the respective receivers H H', which apertures are, by the oscillating motion of the twin receiver, made to alternately coincide with the discharge-aperture of the hopper B, so that the one receiver will be filling while the other is discharging, and so on alternately. The part of the valve-face intervening between the apertures $i$ $i'$ should have sufficient lap to close the discharge-orifice of the hopper and prevent direct communication between the apertures $i$ $i'$ during the oscillating motion. Each receiver has a sloping bottom to facilitate discharge and provided with outlet-flaps $k$ $k'$, opening outward and held closed by external air-pressure against the admission of air during the filling of the receiver. The oscillating motion of the twin receiver is controlled by mechanism consisting of a pair of steelyards K K', (one for each direction of motion,) centered on axes $k^2$ and provided with jockey-weights $k^3$ for regulating the resistance of the steelyards to the average weight of the box-load of grain. To the short arms of the steelyards are pivoted pendent catches $l$, and upon one or other pair of these catches rest lugs $m$, fixed to the tumbling-box in order to support it in position during the filling of the corresponding chamber. These catches $l$ are connected by slotted links $n$ to a pin $n'$ on the frame, whereby when the load of the one chamber (H', for example) overcomes the corresponding steelyard K' the catch $l$ will be drawn out of engagement with the lug $m$ and the twin receiver will be caused by the preponderating weight of the load to fall over to the other side, as shown in dotted lines, thus bringing the other chamber into position to be filled, and by disconnecting the full receiver from the exhaust and putting it in communication with the air allowing its discharge-flap to be pressed open by and discharge the grain.

To prevent shock by the too sudden oscillation of the twin receiver, its motion is checked by a dash-pot or cataract-cylinder N, whose piston is connected to the receiver, as shown.

Having now particularly described and ascertained the nature of the said invention and in what manner the same is to be performed, I declare that what I claim is—

1. In pneumatic grain-conveying apparatus, the combination, with an exhausted hopper having a discharge-mouth at bottom surrounded by a curved valve-seat, of the discharging-receiver mounted to rock on a horizontal axis and divided into two compartments having inclined floors leading down to outwardly-opening self-closing discharge-flaps in the ends and having a valve-face at top, curved concentrically to the axis of oscillation, with apertures therein, the said valve-face being fitted to work air-tight against the correspondingly-curved valve-seat around the hopper-mouth, the intermediate portion of the valve-face having such an amount of lap that by the rocking motion of the receiver connection will be automatically made between the hopper and one or other alternately of the two compartments of the receiver, and at same time that the other compartment will be opened to the air without permitting communication of the hopper with the air during this motion, and counterweighted detent mechanisms adapted to engage with the oscillating receiver and supporting it in its filling position until a sufficiently preponderating load has accumulated, and which is then caused by the preponderance of said load to release the receiver and permit it to fall over suddenly to the other side, substantially as specified.

2. In pneumatic grain-conveying apparatus comprising a hopper and rocking receiver divided into two compartments alternately making connection with the hopper and the air, as described, the combination, with the rocking receiver, of automatic releasing mechanism, consisting of counterweighted levers, slotted links, latches connected therewith and adapted to engage with and support the rocking receiver, and connections between the latches and the weighted arms, whereby the motion of the latter under the preponderating weight of the load in the one chamber of the receiver will cause the corresponding latch to be disengaged and allow the receiver to rock and put the empty chamber in communication with the hopper and the full chamber to discharge its load, substantially as specified.

The foregoing specification of my delivery apparatus for pneumatic grain-conveyers signed by me this 6th day of August, 1891.

FREDERIC ELIOT DUCKHAM.

Witnesses:
JOHN DEAN,
T. T. BARNES,
*Both of No. 17 Gracechurch Street, London, E. C., Notary's Clerks.*